US007031932B1

(12) United States Patent
Lipsky et al.

(10) Patent No.: US 7,031,932 B1
(45) Date of Patent: Apr. 18, 2006

(54) DYNAMICALLY OPTIMIZING THE PRESENTATION OF ADVERTISING MESSAGES

(75) Inventors: Scott Eric Lipsky, Seattle, WA (US); Chen Yu, Pittsburgh, PA (US)

(73) Assignee: aQuantive, Inc., Seattle, WA (US)

( * ) Notice: Subject to any disclaimer, the term of this patent is extended or adjusted under 35 U.S.C. 154(b) by 1154 days.

(21) Appl. No.: 09/626,266

(22) Filed: Jul. 25, 2000

Related U.S. Application Data (60) Provisional application No. 60/167,055, filed on Nov. 22, 1999.

(51) Int. Cl.
*G06F 17/60* (2006.01)

(52) U.S. Cl. ........................................................ 705/14
(58) Field of Classification Search ................... 705/14
See application file for complete search history.

(56) References Cited

U.S. PATENT DOCUMENTS

| | | | | |
|---|---|---|---|---|
| 5,724,521 A | * | 3/1998 | Dedrick ........................ | 705/26 |
| 5,848,396 A | * | 12/1998 | Gerace ......................... | 705/10 |
| 6,061,660 A | * | 5/2000 | Eggleston et al. ............ | 705/14 |

FOREIGN PATENT DOCUMENTS

JP         2000056720 A    *   2/2000

OTHER PUBLICATIONS

Anonymous, Tips to Make your Internet advertiements more effective, May 5, 1997, Mediaweek, p. 46, 4 pages.*

* cited by examiner

*Primary Examiner*—Arthur Duran
(74) *Attorney, Agent, or Firm*—Perkins Coie LLP (57) ABSTRACT

A facility for adjusting the execution of an advertising campaign in which advertising messages are presented using a plurality of advertising alternatives as described. During a first time period, the facility presents advertising messages using each of the advertising alternatives in accordance with an initial allocation for each of the advertising alternatives. Also during the first time period, the facility tracks the performance of the advertising campaign with respect to each of the advertising alternatives. Based upon the tracking during the first time period, the facility attributes a performance score to each of the advertising alternatives for the first time period. The facility compares these scores, and, based upon the comparison, adjusts the allocations for the advertising alternatives so as to increase one or more allocations for advertising alternatives which compare favorably in the comparison, and so as to reduce one or more allocations for advertising alternatives comparing disfavorably in the comparison. The facility then, during a second time period, presents advertising messages using each of the advertising alternatives in accordance with the adjusted allocation for each of the advertising alternatives.

7 Claims, 5 Drawing Sheets

Cost Package 1

| | Placement | Advertising Message | Allocation | Impressions | Conversions | Conversion Rate | Cost | Cost Per Conversion |
|---|---|---|---|---|---|---|---|---|
| 311 | 1 | 1 | .33 | 243,655 | 23 | 0.0001 ± 0.0124 | | |
| 312 | 1 | 2 | .34 | 234,333 | 234 | 0.0010 ± 0.0404 | | |
| 313 | 1 | 3 | .33 | 243,332 | 4565 | 0.0188 ± 0.1737 | | |
| 314 | 2 | 1 | .05 | 55,443 | 456 | 0.0082 ± 0.1156 | | |
| 315 | 2 | 2 | .95 | 1,234,343 | 87 | 0.0001 ± 0.0107 | | |
| 316 | 3 | 1 | .08 | 24,332 | 568 | 0.0233 ± 0.1933 | | |
| 317 | 3 | 2 | .77 | 234,337 | 456 | 0.0019 ± 0.0564 | | |
| 318 | 3 | 3 | .15 | 46,466 | 45 | 0.0010 ± 0.0398 | | |
| 319 | 4 | 1 | .15 | 676,764 | 5 | 0.0000 ± 0.0035 | | |
| 320 | 4 | 2 | .07 | 345,443 | 445 | 0.0013 ± 0.0459 | | |
| 321 | 4 | 3 | .78 | 3,545,434 | 564 | 0.0002 ± 0.0161 | | |
| 322 | 5 | 1 | .11 | 787,894 | 56 | 0.0001 ± 0.0108 | | |
| 323 | 5 | 2 | .79 | 5,679,809 | 7504 | 0.0013 ± 0.0465 | | |
| 324 | 5 | 3 | .10 | 683,266 | 56 | 0.0001 ± 0.0116 | | |
| 325 | | | | | 15064 | | $200,000 | $ 13.28 |

*Fig. 3*

Cost Package 1

| Placement | Advertising Message | Allocation | Impressions | Conversions | Conversion Rate | Cost | Cost Per Conversion |
|---|---|---|---|---|---|---|---|
| 1 | 1 | 0 | — | 0 | — | | |
| 1 | 2 | 0 | — | 0 | — | | |
| 1 | 3 | 1 | 721,000 | 13526.23165 | 0.0188 | | |
| 2 | 1 | 1 | 1,300,000 | 10692.06212 | 0.0082 | | |
| 2 | 2 | 0 | — | 0 | — | | |
| 3 | 1 | 1 | 300,000 | 7003.123459 | 0.0233 | | |
| 3 | 2 | 0 | — | 0 | — | | |
| 3 | 3 | 0 | — | 0 | — | | |
| 4 | 1 | 0 | — | 0 | — | | |
| 4 | 2 | 1 | 4,567,000 | 5883.213728 | 0.0013 | | |
| 4 | 3 | 0 | — | 0 | — | | |
| 5 | 1 | 0 | — | 0 | — | 507 | |
| 5 | 2 | 1 | 7,150,000 | 9446.373989 | 0.0013 | | |
| 5 | 3 | 0 | 0 | 0 | — | | |
| | | | | 46551.00494 | | $ 200,000 | $ 4.30 |

Cost Package 1

| | Placement | Advertising Message | Allocation | Impressions | Conversions | Conversion Rate | Cost | Cost Per Conversion |
|---|---|---|---|---|---|---|---|---|
| 511 | 1 | 1 | 0 | — | 0 | — | | |
| 512 | 1 | 2 | 0 | — | 0 | — | | |
| 513 | 1 | 3 | 1 | 721,000 | 13526.23165 | 0.0188 | | |
| 514 | 2 | 1 | 1 | 1,300,000 | 10692.06212 | 0.0082 | | |
| 515 | 2 | 2 | 0 | — | 0 | — | | |
| 516 | 3 | 1 | 1 | 300,000 | 7003.123459 | 0.0233 | | |
| 517 | 3 | 2 | 0 | — | 0 | — | | |
| 518 | 3 | 3 | 0 | — | 0 | — | | |
| 519 | 4 | 1 | 0 | — | 0 | — | | |
| 520 | 4 | 2 | 1 | 4,567,000 | 5883.213728 | 0.0013 | | |
| 521 | 4 | 3 | 0 | — | 0 | — | | |
| 522 | 5 | 1 | 0 | — | 0 | — | | |
| 523 | 5 | 2 | 1 | 7,150,000 | 9446.373989 | 0.0013 | | |
| 524 | 5 | 3 | 0 | — | 0 | — | | |
| 525 | | | | 0 | 46551.00494 | — | $ 200,000 | $ 4.30 |

DYNAMICALLY OPTIMIZING THE PRESENTATION OF ADVERTISING MESSAGES

CROSS REFERENCE TO RELATED APPLICATION

This application claims the benefit of provisional U.S. Patent Application No. 60/167,055 filed Nov. 22, 1999 which is hereby incorporated by reference.

TECHNICAL FIELD

The present invention is directed to Internet advertising techniques.

BACKGROUND

The World Wide Web ("the Web") is a medium for making content available to requesting users, also known as "publishing" content. A Web publisher may provide content of various types, including visual Web pages having textual and static visual contents, as well as such other content such as animated images and audio and video sequences. The relatively low cost of publishing content on the Web enables many organizations and individuals to act as Web publishers.

To access content made available on the Web, a user typically directs a Web client program, or "browser," executing on his or her computer system to obtain and display a particular unit of content. Units of content are each identified by an address, also called a Uniform Resource Locator, or URL. The user may direct the browser to obtain and display a unit of content by directly entering the URL for the unit of content, or by selecting a link or bookmark with which the URL is associated.

Internet advertising is a practice in which a Web publisher adds an advertising message or other content provided by a third party advertiser to the content provided by the Web publisher in exchange for payment or other consideration from the advertiser. For example, a Web-based travel agency may pay the publisher of a Web site directed to tips for travelers to add a banner advertisement for the Web-based travel agency to some of the Web pages comprising the Web site. Such a banner advertisement typically presents visual information promoting the advertiser that takes up a portion of the area of the Web page. Some banner advertisements further constitute a link to a web site associated with the advertiser, so that the user may click anywhere within the banner advertisement to display, or "click through to," that Web site, and perform additional actions there, such as purchasing a product or registering with the advertiser Web site. When such additional actions are performed, it is said that a "conversion" has occurred.

In the terminology of Web advertising, a particular banner advertisement may be called a "creative" or a "advertising message." The different locations on Web pages of publisher Web sites that the publisher makes available for advertising are called "placements." An instance of presenting a particular creative in a particular placement for a particular use is called an "impression." When a publisher enters into an advertising agreement with an advertiser in which the advertiser purchases for a single price the opportunity to display a certain number of impressions in each of a number of placements, these placements and impressions are said to constitute a "cost package."

As computer use, and particularly the use of the Web, becomes more and more prevalent, the volume of Internet advertising presented grows larger and larger. As this volume continues to increase, the need to optimize the effectiveness of advertising increases significantly.

In this connection, it is now common for an advertiser to mount a campaign for an advertiser's cause, in which it presents a number of different "alternative" advertising messages for the cause in each of a number of different placements. Indeed, many advertising campaigns utilize multiple cost packages of placements purchased from multiple publishers.

Such an extensive campaign can be difficult to manage in an active manner. In particular, it can be difficult to determine whether to increase or decrease the number of impressions presented in a particular cost package, whether to increase or decrease the number of impressions presented in a particular placement, and whether to increase or decrease the rate at which a particular creative is presented.

Accordingly, a facility for automatically and dynamically optimizing the use of resources in an advertising campaign would have significant utility.

BRIEF DESCRIPTION THE DRAWINGS

FIGS. 3–5 are data structure diagrams showing the analysis of sample data by the facility.

DETAILED DESCRIPTION

A software facility for automatically and dynamically optimizing the use of resources in an advertising campaign is provided. In designing an advertising campaign, an advertising service selects cost packages to use in presenting advertising messages for the campaign, each of which constitutes an opportunity to present a certain number advertising messages in each one or more placements. The advertising service further selects a number of advertising messages to present as part of the campaign. The facility conducts the campaigns, presenting the selected advertising messages in the placements within the selected cost packages While conducting the campaign, facility maintains statistics indicating the level of performance of each of the advertising messages, placements, and cost packages.

After the campaign has been conducted for a period of time, the facility compares the performance of the selected advertising messages, placements, and cost packages, and scores their relative performance. Performance scores for these aspects of the campaign, sometimes called "advertising alternatives," may be based upon a variety of factors, including click-throughs, conversions, and sales produced by these advertising alternatives, as well as their cost. To the extent that reallocations between advertising messages, placements, and cost packages are possible, the facility performs reallocations from advertising messages, placements, and cost packages indicated by their performance scores to be performing at a low level to higher-performing ones.

For example, reallocating between cost packages may involve negotiating with the publisher or other seller of a higher-performing cost package to increase the volume of the higher-performing cost package, as well as negotiating with the publisher or other seller of a lower-performing cost package to cancel or decrease the volume of the lower-performing cost package. Reallocating between the placements of a cost package may involve negotiating with the publisher or other seller of the cost package to increase the volume of the higher-performing allocations of the cost package and decrease the volume of the lower-performing allocations of the cost package. Reallocating between advertising messages presented in a placement may involve increasing the probability that higher-performing advertising messages are served in response to an advertising message request for the placement and decreasing that probability for lower-performing advertising messages. After adjusting these allocations in accordance with the effectiveness scores, the facility continues the campaign using these new allocations, again maintaining performance statistics in order to later perform further reallocations.

In some embodiments, the facility manages the operation of several advertising campaigns simultaneously. For example, the facility may simultaneously manage the operation of campaigns for several different advertisers. This further extends the facility's ability to optimize campaign performance, by enabling the facility to exchange measures of advertising alternatives between campaigns, thereby allowing reallocation of advertising alternatives that otherwise could not be reallocated, e.g., allowing reallocation between two cost packages whose seller declines to renegotiate.

By automatically optimizing the operating of advertising campaigns on-the-fly based upon the actual performance of the various advertising alternatives that comprise the campaign in this manner, the facility greatly increases the effectiveness of the campaign and produces significant efficiencies in operating the campaign.

Figure 1:
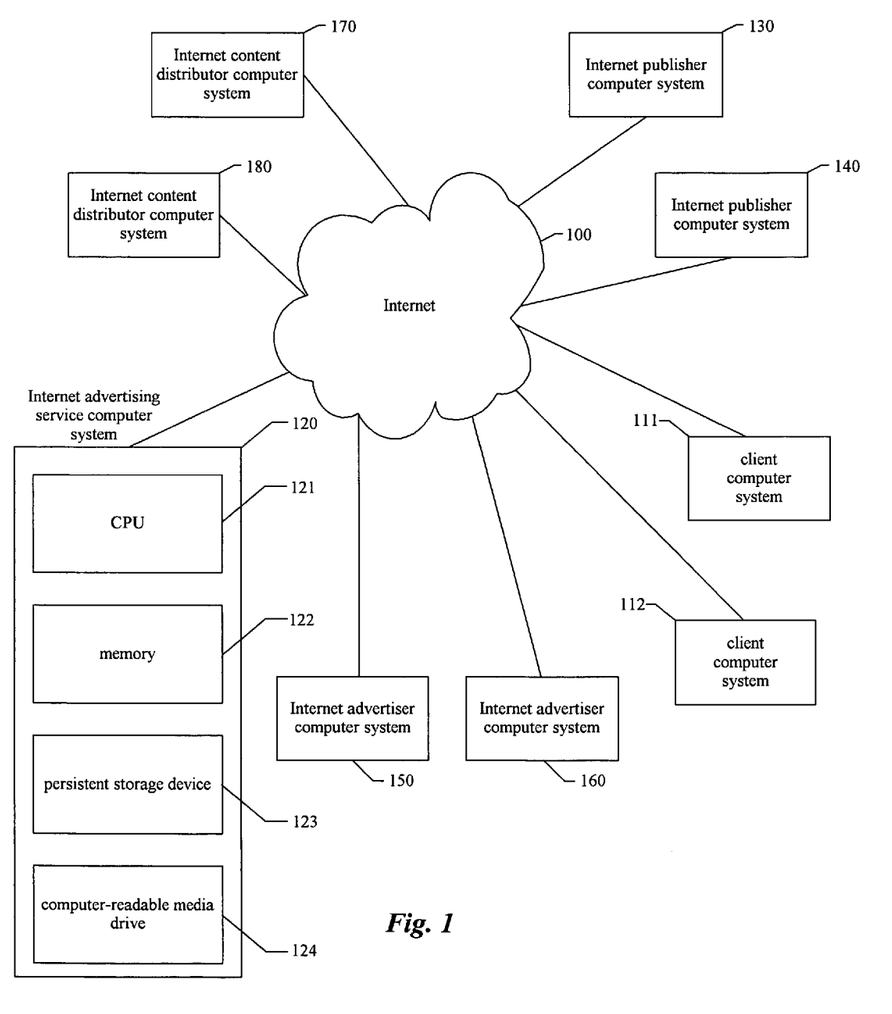
FIG. 1 is a high-level block diagram showing the environment in which the facility preferably operates.

FIG. 1 is a high-level block diagram showing the environment in which the facility preferably operates. The diagram shows client computer systems 111 and 112. An Internet user preferably uses one of these client computer systems to connect, via the Internet 100, to an Internet publisher computer system, such as Internet publisher computer systems 130 and 140, to retrieve and display a Web page.

In cases where an Internet advertiser, through the Internet advertising service, has purchased advertising space on the Web page provided to the Internet user computer system by the Internet publisher computer system, the Web page contains a reference to a URL in the domain of the Internet advertising service computer system 120. When a user computer system receives a Web page that contains such a reference, the Internet user computer systems sends a request to the Internet advertising service computer system to return data comprising an advertising message, such as a banner advertising message. When the Internet advertising service computer system receives such a request, it selects an advertising message to transmit to the Internet user computer system in response the request, and either itself transmits the selected advertising message or redirects the request containing an identification of the selected advertising message to an Internet content distributor computer system, such as Internet content distributor computer systems 170 and 180. When the Internet user computer system receives the selected advertising message, the Internet user computer system displays it within the Web page.

The displayed advertising message preferably includes one or more links to Web pages of the Internet advertiser's Web site. When the Internet user selects one of these links in the advertising message, the Internet user computer system dereferences the link to retrieve the Web page from the appropriate Internet advertiser computer system, such as Internet advertiser computer system 150 or 160. In visiting the Internet advertiser's Web site, the Internet user may traverse several pages, and may take such actions as purchasing an item, bidding in an auction, or registering as a user of the Internet advertiser. Revenue from such actions typically finances, and is often the motivation for, the Internet advertiser's Internet advertising.

The Internet advertising service computer system 120 preferably includes one or more central processing units (CPUs) 121 for executing computer programs such as the facility, a computer memory 122 for storing programs and data while they are being used, a persistent storage device 123 such as a hard drive for persistently storing programs and data, and a computer-readable media drive 143, such as a CD-ROM drive, for reading programs and data stored on a computer-readable medium.

While preferred embodiments are described in terms of the environment described above, those skilled in the art will appreciate that the facility may be implemented in a variety of other environments, including a single, monolithic computer system, as well as various other combinations of computer systems or similar devices.

In an embodiment discussed in detail below, the facility judges the effectiveness of advertising messages, placements, and cost packages in terms of the conversion rates that they produce. In some embodiments, however, the facility preferably uses a rating function that rates the effectiveness of each alternative advertising message when presenting each placement and cost package in which it is presented based upon other factors. The rating function preferably has a positive reaction, for a particular advertising message and publisher, to one or more of the following factors: (1) "conversion rate," the percentage of presentations of the advertising message at the publisher to users that coincided with users that performed some action on the advertiser's web site, such as visiting it or placing an order; (2) "click rate," the percentage of times the advertising message was presented at the publisher and was clicked on by the user viewing the advertising message; and/or (3) "average transaction value," the average dollar amount of orders placed by customers that viewed the advertising message at the publisher. The rating function also preferably has a negative reaction, for a particular advertising message and publisher, to the financial cost of presenting the advertising message at the publisher. After the rating function is applied to each advertising message for a particular publisher to produce raw rating scores, the raw rating scores are preferably normalized so that they sum to 100% for the publisher.

In various embodiments, the rating function is applied to update the weights at various frequencies, including frequencies such as once per week, once per day, once per hour, or continuously.

In certain embodiments, the rating function limits the extent to which the rating of a particular advertising message and publisher can change during a single period. For example, in one preferred embodiment, the rating function is limited to changing no more than 5% per period.

In some embodiments, the facility retains the initial weightings without applying the rating function until a minimum number of advertising message presentations is reached. For example, the facility may defer re-weighting until a minimum number of total presentations of any of the advertising messages within the group at any of the publishers is reached. In additional embodiments, re-weighting is deferred until each advertising message, each publisher, or each combination of an advertising message and a publisher has a certain number of presentations.

In one embodiment, the facility maintains a history of the advertising presentation weights used during each period to facilitate the review of the performance of the advertising messages using different weights. In this manner, the facility can analyze the effects of particular weighting changes on performance.

Figure 2:
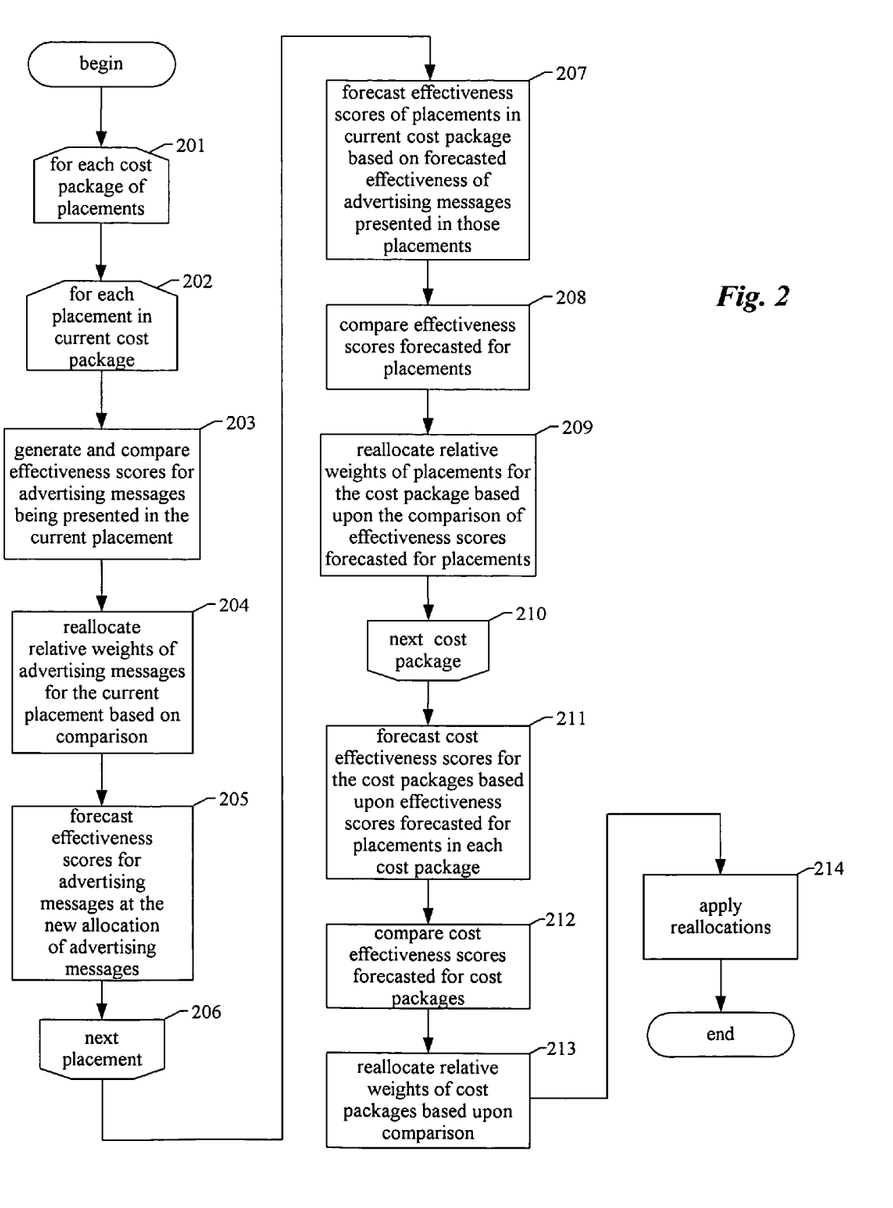
FIG. 2 is a flow diagram showing the steps preferably performed by the facility in order to optimize the performance of an advertising campaign.

FIG. 2 is a flow diagram showing the steps preferably performed by the facility in order to optimize the performance of an advertising campaign. This process is preferably repeated by the facility periodically for each advertising campaign that is being managed by the facility. In steps 201–210, the facility loops through each cost package of placements that has been selected for the facility. In steps 202–206, the facility loops through each placement of the current cost package. In step 203, the facility generates scores measuring the effectiveness of advertising messages that have been presented in the current placement. In a preferred embodiment, effectiveness scores correspond to conversion rates—that is, the fraction of impressions of the advertising messages that lead to a conversion on the advertiser's web site, such as a purchase. In this embodiment, the effectiveness score of an advertising message is calculated by dividing the number of conversions produced by presenting the advertising message in the current placement by the number of times the advertising message was presented in the current placement, also described as the number of impressions of the advertising message in the current placement. As is discussed elsewhere herein, additional embodiments of the present invention utilize a variety of other formulae for generating effectiveness scores, which are in these embodiments utilized in step 203.

In step 203, the facility further compares the effectiveness scores generated for the advertising messages being presented in the current placement. In one preferred embodiment, the facility compares the absolute effectiveness scores of the advertising messages. In another preferred embodiment, the facility compares confidence intervals about the scores. Confidence intervals relate to statistical measures, such as effectiveness scores, that are based on a finite number of observations, or "samples." A confidence interval indicates a range of values around, or "about," the statistical measure into which there is a particular probability that the same statistical measure based upon a much larger population of samples will fall. In one embodiment, the facility compares 80 percent confidence intervals about the scores, meaning that the facility compares ranges about the scores into which there is an 80 percent chance that scores based on a much larger population of samples will fall.

Equations (1)–(12) below show the derivation of the formula in equation (12) preferably used by the facility to calculate an 80 percent confidence interval about each effectiveness score. Equation (1) indicates that the confidence interval $(a,b)_\alpha$ for a particular confidence level $\alpha$ is defined as the statistical measure $\bar{x}$, here the effectivess score±a confidence interval radius $c_{60}$ for that confidence level.

$$(a,b)_\alpha = \bar{x} \pm c_\alpha \quad (1)$$

Equation (2) indicates that the confidence interval radius $c_\alpha$ is equal to a z-score $z_\alpha$ for the confidence level multiplied by the standard deviation of the larger population $\sigma$ and divided by the square root of the number of samples n upon which the statistical measure is based.

$$c_\alpha = \frac{z_\alpha \sigma}{\sqrt{n}} \quad (2)$$

Equation (3) indicates that, in accordance with the Central Limit Theorem, the standard deviation $\sigma$ of the larger population can be assumed to be equal to the standard deviation s of the samples upon which the statistical measure is based.

$$\sigma = s \quad (3)$$

Equation (4) indicates that the standard deviation s of the samples upon wich the statistical measure is based is equal to the square root of the product of the proportion of successes p times the proportion of failures (1−p).

$$s = \sqrt{p(1-p)} \quad (4)$$

Equation (5) shows the substitution of equations (3) and (4) in equation (1).

$$c_\alpha = z_\alpha \sqrt{\frac{p(1-p)}{n}} \quad (5)$$

Equation (6) shows that, in this case, the number of samples n upon which the statistical measure is based is the number of impressions in which the current advertising message was presented in the current placement.

$$n = \text{impressions} \quad (6)$$

Equation (7) shows that the proportion of successes p is equal to the number of conversions that resulted from presenting the current advertising message in the placement divided by the number of impressions.

$$p = \frac{\text{conversions}}{\text{impressions}} \quad (7)$$

Equation (8) shows the substitution of equations (6) and (7) in equation (5).

$$c_\alpha = z_\alpha \frac{\sqrt{\frac{\text{conversions}}{\text{impressions}}\left(1 - \frac{\text{conversions}}{\text{impressions}}\right)}}{\text{impressions}} \quad (8)$$

Equation (9) shows the simplification of equation (8).

$$c_\alpha = \frac{z_\alpha \sqrt{\text{conversions}(\text{impressions} - \text{conversions})}}{\text{impressions}} \quad (9)$$

Equation (10) shows that the z-score for an 80 percent confidence interval is 1.28, as derived from statistical tables.

$$z_{80\%} = 1.28 \quad (10)$$

Equation (11) shows the substitution of equation (10) in equation (9).

$$c_{80\%} = \frac{1.28\sqrt{\text{conversions(impressions} - \text{conversions)}}}{\text{impressions}} \quad (11)$$

Equation (12) shows the substitution of equation (11) in equation (1), and indicates how to calculate an 80 percent confidence interval about a conversion rate effectivess score for a particular advertising message in a particular placement given the number of conversions and the number of impressions measured for that advertising message in that placement.

$$(a, b)_{80\%} = \frac{\text{conversions}}{\text{impressions}} \pm \frac{1.28\sqrt{\text{conversions(impressions} - \text{conversions)}}}{\text{impressions}} \quad (12)$$

In step 204, the facility reallocates the relative weights of the advertising messages for the current placement based upon the comparison performed in step 203. When an advertising message presentation request is received requesting an advertising message to present in the current placement, these weights are used to determine which advertising message to return. The weight for a particular advertising message reflects the relative likelihood that that advertising message will be returned in response to each such request. A number of embodiments of the facility utilize various reallocation schemes in step 204. In some embodiments, one or more advertising messages are "dropped" by assigning them a weight of zero, thereby increasing the relative weights of the advertising message that are not dropped. In these embodiments, any number of advertising messages may be dropped: a single lowest-performing advertising messages, the bottom-performing n advertising messages, the lowest-performing half of the advertising messages, all but the highest-performing advertising message, etc. In other embodiments, the facility incrementally adjusts the weight of each advertising message, incrementally reducing the weights of lower-performing advertising messages, and incrementally increasing the weights of higher-performing advertising messages. Additional reallocation schemes may also be employed.

In step 205, the facility forecasts the effectiveness scores for the advertising messages based upon the new allocation of advertising messages created in step 204. In step 206, the facility loops back to step 202 to process the next placement in the current cost package. After the last placement in the current cost package has been processed, the facility continues in step 207. In step 207, the facility forecasts the effectiveness scores of the placements in the current cost package based upon the effectiveness scores forecasted in step 205 for the advertising messages presented in those placements. In step 208, the facility compares the effectiveness scores forecasted in step 207 for the placements in the current cost package. Step 208 is preferably performed in a manner similar to the comparison performed in step 203. In step 209, the facility reallocates the relative weights of the placements in the cost package based upon the comparison of the effectiveness scores forecasted for them in step 208. Step 209 is preferably performed in a manner similar to that of step 204. Reallocating between the placements of a cost package may involve negotiating with the publisher or other seller of the cost package to increase the volume of the higher-performing allocations of the cost package and decrease the volume of the lower-performing allocations of the cost package. In step 210, the facility loops back to step 201 to process the next cost package. After the last cost package is processed, the facility preferably continues in step 211. In step 211, the facility forecasts cost effectiveness scores for the cost packages based upon effectiveness scores forecasted in step 207 for the placements in each cost package. In step 212, the facility compares the cost effectiveness scores forecasted in step 211 for the cost packages. Step 212 is preferably performed in a manner similar to the comparison of step 203. In step 213, the facility reallocates the relative weights of the cost packages based upon the comparison of step 212. Step 213 is preferably performed in a manner similar to the comparison of step 204. Reallocating between cost packages may involve negotiating with the publisher or other seller of a higher-performing cost package to increase the volume of the higher-performing cost package, as well as negotiating with the publisher or other seller of a lower-performing cost package to cancel or decrease the volume of the lower-performing cost package. In step 214, the facility applies the reallocations performed in steps 204, 209, and 213. After step 214, these steps conclude.

Figure 5:
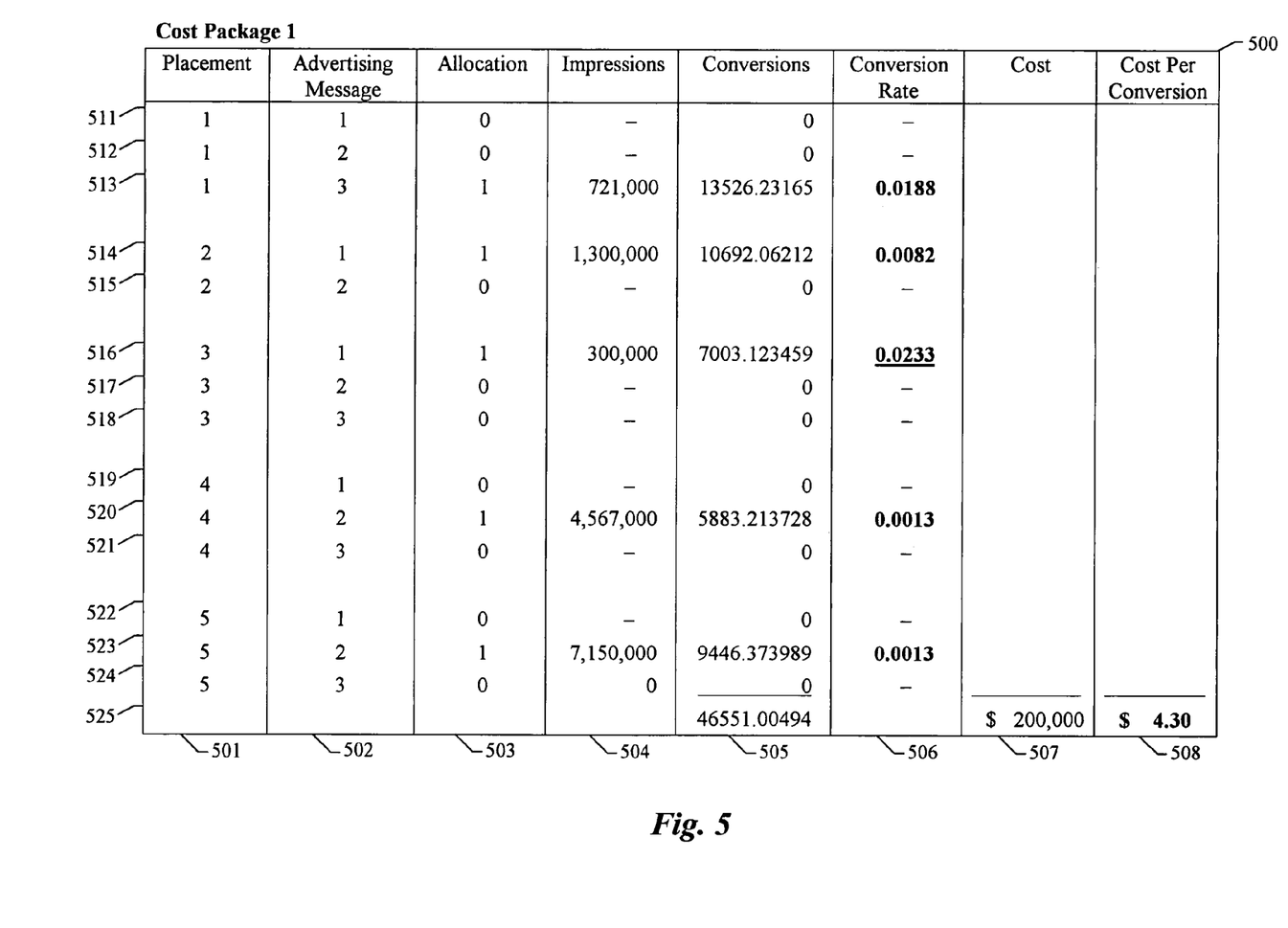

FIGS. 3–5 are data structure diagrams showing the analysis of sample data by the facility. FIGS. 3–5 show sample data for a single cost package. As is discussed herein, however, the facility is preferably capable of managing campaigns that make use of more than one cost package, and, indeed, managing several such campaigns simultaneously.

FIG. 3 is a data structure diagram showing data relating to the performance of a sample cost package. A table 300 contains rows 311–325. Rows 311–324 each correspond to a different combination of a placement and an advertising message presented in that placement. Row 325 contains values aggregated from rows 311–324. Each row contains a field in each of the following columns: a placement column 301 identifying a placement in the cost package; an advertising message 302 identifying an advertising message presented in that placement; an allocation column 303 showing the current allocation weighting for the advertising message without the placement; an impressions column 304 indicating the number of times that the identified advertising message has been presented in the identified placement; a conversions column 305, indicating the number of such impressions that have resulted in a conversion event at the advertiser's web site; a conversion rate column 306 indicating the quotient of conversions over impressions; a cost column 307 indicating, in row 325, the cost of presenting the counted impressions; and a cost per conversion column 308 indicating, in row 325 the ultimate cost incurred per conversion. For example, the contents of row 312 show that advertising message 2 has been presented in placement 1 234,333 times and produced 234 conversions, thus achieving a conversion rate of 0.0010±0.0404. The conversion rate of 0.0010 is obtained by the facility by dividing 234 conversions by 234,333 impressions. The confidence interval rate is of 0.0404 is obtained in accordance with equation (11) by subtracting the number of conversions, 23, from the number of impressions, 243,655, then multiplying by the number of conversions, 23, then taking the square root of this quantity, then multiplying by 1.28 and dividing by the number of impressions, 234,655. Row 325 shows that using cost package 1 in the current campaign has produced a total of 1,564 conversions, at a total cost of $200,000, for an ultimate cost per conversion of $13.28. It can be seen that advertising message 3 has the highest conversion rate for placement 1, advertising message 1 has the highest conversion rate for placement 2, advertising message 1 has the highest conversion rate for placement 3, advertising message 2 has the highest conversion rate for placement 4, and advertising message 2 has the highest conversion rate for placement 5.

FIG. 4 is a data structure diagram showing reallocation among advertising messages for each placement. Table 400 shows the result of reallocating weights among the advertising messages displayed in each placement. By comparing the new allocation weights shown in allocation column 403 to the conversion rates shown in column 306 of FIG. 3, it can be seen that the facility has assigned a new weight of 1 to the advertising message for each placement having the highest conversion rate, and an allocation weight of 0 to each of the other advertising messages within the placement. For example, advertising message 3 having the highest conversion rate within placement 1, is assigned an allocation weight of 1 for placement 1, while advertising messages 1 and 2 are assigned an allocation weight of 0 for placement 1. Impressions column 404 shows the number of impressions forecasted for each combination of placement and advertising message in the next analysis cycle. For placement and advertising message combinations having an allocation weight of 0, 0 impressions are projected. For placement and advertising message combinations having weight of 1, a number of impressions equal to the sum of observed impressions for all of the advertising messages for that placement is projected. For example, the 721,000 impressions projected for advertising message 3 in placement 1 is the sum of the number of impressions observed for all advertising messages in placement 1. Conversions column 405 contains a projection of the number of conversions that will be produced by those impressions, and is obtained by multiplying the projected number of impressions in column 404 by the observed conversion rate shown in column 306. For example, the projection of 313,526 conversions shown for placement 1 in advertising message 3 is the product of 721,000 impressions and a conversion rate of 0.0188. The conversions field in row 425 is updated to be the sum of projected conversions. Similarly, the cost per conversion field in row 425 is updated to a projection of $4.30 per conversion by dividing the total cost of $200,000 by the projected total number of conversions, 46,551. Thus, it can be seen that, by reallocating advertising message weights as shown, the facility projects that is will reduce an ultimate cost per conversion from $13.28 to $4.30.

FIG. 5 is a data structure diagram showing the comparison of the performance of placements within a cost package. Table 500 shows that the facility, for each placement, attributes the conversion rate of the non-zero weighted advertising message to the entire placement. On that basis, the facility compares the conversion rates attributed to each placement for the purpose of performing a reallocation among placements. The facility determines that placement 3 has the highest conversion rate, 0.0233. Accordingly, the facility, if possible, reweights the placements so as to increase the allocation to placement 3 and decrease the allocation to lower-performing placements, such as placements 4 and 5. Based on these reallocations among the placements of cost package 1, the facility preferably repeats its forecasting to determine a new cost per conversion for cost package 1. On this basis, it preferably compares the cost per conversion projected for cost package 1 to costs per conversion similarly projected for the other cost packages of the campaign, and performs a reallocation away from cost packages having a higher cost per conversion toward cost packages having a lower cost per conversion.

It will be understood by those skilled in the art that the above-described facility could be adapted or extended in various ways. For example, while advertising campaigns in which the advertising alternatives are advertising messages, placements, and cost package are discussed above, the facility may be straightforwardly adapted to manage advertising campaigns having more, fewer, or different advertising alternatives. Additionally, the facility may employ a variety of different types of effectiveness scores for comparing the effectiveness of different advertising alternatives. Further, in the foregoing, embodiments of the facility have been described that automatically manage advertising campaigns in which advertising messages are delivered via the World Wide Web to users using general-purpose computer systems executing web browsers. Additional embodiments of the facility may be used to manage campaigns in which advertising messages are presented to users via various other communication channels and other types of devices, including special-purpose devices such as personal digital assistants, cellular and satellite telephones, devices installed in automobiles and other vehicles, pagers, automatic teller machines, televisions, and other home appliances. Moreover, a further embodiment of the facility is adapted to allocate advertising alternatives separately for each of a number of these alternative outlet types, so that, for example, an advertisement that is particularly effective on a certain publisher via personal digital assistants is presented more frequently on personal digital assistants than alternative advertisements.

While the foregoing description makes reference to various preferred embodiments, the scope of the invention is defined solely by the claims that follow and the elements recited therein.

We claim:

1. A method in a computing system for modifying the execution of a computer network-delivered advertising campaign in which advertising messages are presented in placements, and in which placements occur within cost packages, comprising:

compiling data reflecting the effectiveness of the advertising campaign during an evaluation period, the compiled data reflecting the effectiveness of a plurality of cost packages within the campaign, the compiled data further reflecting the effectiveness of one or more placements within each of the cost packages, the compiled data further reflecting the effectiveness of one or more advertising messages presented in each of the plurality of placements;

for each of the plurality of placements, based upon the data reflecting the effectiveness of presenting each advertising message in the placement during the evaluation period, generating a weighting for each of the advertising messages within the placement such that the weightings generated for the advertising messages correlate positively with the level of effectiveness of presenting the advertising messages within the placement;

for each of the plurality of cost packages, based upon the data reflecting the effectiveness of each placement within the cost package during the evaluation period, generating a weighting for each of the placements within the cost package such that the weightings generated for the placements correlate positively with the level of effectiveness of the placements within the cost package;

based upon the data reflecting the effectiveness of each cost package during the evaluation period, generating a weighting for each of the cost packages such that the weightings generated for the cost packages correlate positively with the level of effectiveness of the cost packages within the campaign; and continuing the advertising campaign in accordance with the generated weightings for cost packages within the campaign, placements within each cost package, and advertising messages presented in each placement, such that advertising messages are presented within each cost package in accordance with the generated weightings for the cost packages, such that advertising messages are presented within each placement in accordance with the generated weightings for the placements, and such that particular advertising messages are presented within each placement in accordance with the generated weightings for the advertising messages.

2. The method of claim 1 wherein the compiling, generating and continuing is performed for a first evaluation period to generate and apply a first set of weightings, further comprising repeating the compiling, generating, and continuing for a second evaluation period during which the first set of weightings is applied.

3. A method in a computing device for adjusting the execution of an advertising campaign for presenting advertising messages to a plurality of users, the advertising campaign having a plurality of advertising alternatives for presenting advertising messages, comprising:

during a first time period,
  presenting advertising messages to users among the plurality using each of the advertising alternatives in accordance with an initial allocation for each of the advertising alternatives;
  tracking the performance of the advertising campaign with respect to each of the advertising alternatives across the plurality of users;
based upon the tracking during the first time period, attributing a performance score to each of the advertising alternatives for the first time period;
comparing the scores attributed to the advertising alternatives for the first time period, wherein the comparison is performed using confidence intervals about the performance scores;
based upon the comparison, adjusting the allocations for the advertising alternatives so as to increase one or more allocations for advertising alternatives comparing favorably in the comparison and so as to reduce one or more allocations for advertising alternatives comparing disfavorably in the comparison; and
during a second time period, presenting advertising messages to users among the plurality using each of the advertising alternatives in accordance with the adjusted allocation for each of the advertising alternatives.

4. The method of claim 3 wherein the comparison is performed using 80% confidence intervals about the performance scores.

5. A method in a computer system for presenting advertising messages in a group of advertising messages to a plurality of users, comprising:

during an evaluation period, presenting the advertising messages of the group to users among the plurality;

assessing the effectiveness of presenting each of the advertising messages during the evaluation period across the plurality of users;

assigning presentation weights to the advertising messages of the group in accordance with their assessed effectiveness; and during a weighted presentation period, presenting to users among the plurality the advertising messages of the group with relative frequencies that are in accordance with their weights.

6. The method of claim 5 wherein the weighted presentation period is a second evaluation period, and wherein the assessing and assigning is repeated for the second evaluation period.

7. The method of claim 5 wherein the advertising messages are presented at a plurality of advertising sites, and wherein the assessing assesses the effectiveness of presenting each of the advertising messages at each of the advertising sites, and wherein the assigning step assigns an advertising message separate weights for each of the advertising sites, and wherein the weights for the advertising site on which an advertising message is to be presented are used to select the advertising messages to be presented on that advertising site.

* * * * *